UNITED STATES PATENT OFFICE.

WILLIAM RICHARDSON, OF BUFFALO, MISSOURI.

SALVE.

SPECIFICATION forming part of Letters Patent No. 292,255, dated January 22, 1884.

Application filed May 31, 1883. (No specimens.)

*To all whom it may concern:*

Be it known that I, WILLIAM RICHARDSON, a citizen of the United States, residing at Buffalo, and State of Missouri, have invented a certain new and useful Improvement in Medical Compounds; and I do hereby declare the following to be a full, clear, and exact description of the invention, such as will enable others skilled in the art to which it appertains to make and use the same.

This invention relates to new and useful improvements in medical compounds; and has for its objects the manufacture of a salve for the cure of piles. This object is attained in the following manner: I take fresh mullein leaves and boil them to a strong ooze. Then thicken this ooze with hog's lard, using about an equal quantity of each. To eight (8) ounces of the above compound I add one-half of one ounce of gum-camphor and eighty drops of laudanum.

The manner in which the salve is applied is as follows: Before applying the salve bathe the parts in cold water, keeping clean. Do not allow the bowels to become costive. Apply the salve to the parts affected night and morning, or oftener if the case is severe or suffering great.

I am aware that mullein has been used as a salve, as also a mixture composed of lard, camphor, and opium; also, a mixture of galls, lard, camphor, and opium, and I do not claim such, broadly; but What I do claim, and desire to secure by Letters Patent, is—

In a salve for the cure of piles, a compound formed of ooze of mullein-leaves, four ounces, (4 oz.;) hog's lard, four ounces, (4 oz.;) gum-camphor, one-half of one ounce, (½ oz.;) laudanum, eighty drops, (80 drops,) substantially as described, and for the purposes set forth.

In testimony whereof I affix my signature in presence of two witnesses.

WILLIAM RICHARDSON.

Witnesses:
GEO. W. BRAKEBILL,
W. W. BARTON.